(12) United States Patent
Sutherland et al.

(10) Patent No.: US 7,455,274 B2
(45) Date of Patent: Nov. 25, 2008

(54) CARRIER FOR VARIOUS-SIZED ARTICLES OPERATIVELY SUPPORTED BY A VEHICLE

(76) Inventors: Jeffrey D. Sutherland, 31 Alfonso Way, Millville, MA (US) 01529; Michael G. Vieira, 187 Pleasant St., Lowell, MA (US) 01852

( * ) Notice: Subject to any disclaimer, the term of this patent is extended or adjusted under 35 U.S.C. 154(b) by 731 days.

(21) Appl. No.: 10/695,107

(22) Filed: Oct. 24, 2003

(65) Prior Publication Data
US 2005/0087665 A1 Apr. 28, 2005

(51) Int. Cl.
*B65D 19/00* (2006.01)
(52) U.S. Cl. .................... 248/346.01; 248/503; 248/505
(58) Field of Classification Search ............ 248/346.01, 248/682, 689, 500, 499, 503, 505
See application file for complete search history.

(56) References Cited

U.S. PATENT DOCUMENTS

| | | | |
|---|---|---|---|
| 1,285,162 A | | 11/1918 | Hellweg |
| 1,503,083 A | | 7/1924 | Arney |
| 1,613,077 A | | 1/1927 | Bourgon |
| 2,855,198 A | * | 10/1958 | King ........................... 482/91 |
| 2,943,775 A | * | 7/1960 | Mack et al. .................. 224/628 |
| 3,182,804 A | | 5/1965 | Chades |
| 3,502,316 A | * | 3/1970 | Saether ....................... 267/110 |
| 4,308,982 A | * | 1/1982 | Hall ............................ 224/607 |
| 4,487,443 A | * | 12/1984 | Adamick ..................... 294/151 |
| 4,790,460 A | * | 12/1988 | Harper, Jr. .................. 224/644 |
| 4,862,994 A | * | 9/1989 | Hughes, Sr. ................. 182/122 |
| 5,131,576 A | * | 7/1992 | Turnipseed ................. 224/262 |
| 5,285,797 A | * | 2/1994 | Zeller .......................... 5/628 |
| 5,657,766 A | * | 8/1997 | Durham ....................... 5/637 |
| 5,839,713 A | * | 11/1998 | Wright ................... 248/346.01 |
| 5,881,477 A | * | 3/1999 | Watson ........................ 36/122 |
| 6,178,666 B1 | * | 1/2001 | Kiniry et al. .................. 36/125 |
| 6,581,891 B1 | * | 6/2003 | Byrd ....................... 248/219.4 |
| 6,588,440 B2 | * | 7/2003 | Varnado .................. 135/120.1 |
| 6,655,564 B1 | * | 12/2003 | Zupan ......................... 224/628 |
| 2004/0182899 A1 | * | 9/2004 | Deutchman ................. 224/410 |

FOREIGN PATENT DOCUMENTS

DE 19936653 A1 * 2/2001
GB 2131475 A * 6/1984

* cited by examiner

*Primary Examiner*—Anita M King

(57) ABSTRACT

An apparatus supports one or more articles of various sizes on a vehicle surface during transport with a vehicle. The apparatus includes a substantially planar platform for supporting the articles, and one or more straps for securing the articles to the platform. The platform includes: a top slip-resistant surface for preventing the article from sliding along the slip-resistant top surface; a bottom slip-resistant surface for preventing the platform from sliding along the vehicle surface; a plurality of bearing members; a plurality of slots for selectively engaging the straps; one or more handles; and a recess defined within a bottom area of the platform containing the plurality of slots. The straps support the articles by engaging the platform through two or more of the slots, bearing against two or more of the bearing members and passing through the recess without contacting the vehicle surface.

3 Claims, 4 Drawing Sheets

CARRIER FOR VARIOUS-SIZED ARTICLES OPERATIVELY SUPPORTED BY A VEHICLE

This invention relates to a carrier and support for securing one or more articles of different sizes in or on a vehicle.

BACKGROUND OF THE INVENTION

U.S. Pat. No. 1,285,162 granted on Nov. 19, 1918 to Henry Hellweg discloses a package holder for supporting a package onto the running board or any other suitable support surface of an automobile. The package holder has a base with an aperture in one end adapted to receive a fastening member. The top of the base includes a plurality of apertures through any of which the fastening member may be passed. The base includes flanges and bearing members, where the bearing members are adapted to rest against a support surface and the lower edges of the flanges are elevated above the support. The package holder includes means for clamping the base to the support at a point between the bearing members.

U.S. Pat. No. 3,182,804 granted on May 11, 1965 to William J. Chades discloses a bowling bag holder for retaining a bowling bag in a stable condition in a trunk of a car. The bowling bag holder includes a frame made of preferably metal rods with a square or rectangular section and a set of four extensions for additional stability and support. The holder includes straps fastened to the frame for securing a bowling ball.

U.S. Pat. No. 1,503,083 granted on Jul. 24, 1924 to John Amey discloses a luggage carrier adapted to be secured to the running board of an automobile and preferably removable for storage. The luggage carrier is clamped to the running board by a pair of spaced thumb screws. The carrier includes a base, a strut hinged to the base by an elbow hinge, and a securing jaw adapted to underlie the running board, truss connected to the base by a bridge-piece.

U.S. Pat. No. 1,613,077 granted Jan. 4, 1927 to Joseph H. Bourgon discloses an apparatus for holding luggage onto an automobile without any danger of marring or scratching the finish of the vehicle. The apparatus includes a member secured to a surface of the vehicle, the member having openings for running a strap to secure the luggage against rubber abutment elements to prevent marring or scratching the vehicle.

SUMMARY OF THE INVENTION

An apparatus supports one or more articles of various sizes on a vehicle surface during transport with a vehicle. The apparatus includes a substantially planar platform for supporting the articles, and one or more straps for securing the articles to the platform. The platform includes: a top slip-resistant surface for preventing the article from sliding along the slip-resistant top surface; a bottom slip-resistant surface for preventing the platform from sliding along the vehicle surface; a plurality of bearing members; a plurality of slots for selectively engaging the straps; one or more handles; and a recess defined within a bottom area of the platform containing the plurality of slots. The straps support the articles by engaging the platform through two or more of the slots, bearing against two or more of the bearing members and passing through the recess without contacting the vehicle surface.

One object of this invention is to provide a platform for the article that is larger in area than the bottom of the article to prevent the article from tipping when supported by a surface of a vehicle.

Another object is to provide an adjustment apparatus for securing articles of various sizes.

Another object is to provide resistance to sliding between the carrier and a surface of the vehicle, and between the carrier and the article.

A further object is to provide a carrier that itself, with the article not present therein, occupies a minimal volume of storage space.

Another object is to provide a carrier that will allow access to articles, specifically allowing access to any contents within the article, while the article is strapped in the carrier.

A further object is to provide handles along the periphery of the platform, that will allow finger access to the handle when the platform is operatively supported by the surface of the vehicle, and also allow multiple carriers to be stacked nested upon one another for storage space efficiency and stability when no articles are being carried.

BRIEF DESCRIPTION OF THE DRAWINGS

The aforementioned aspects and other features of the invention are described in detail in conjunction with the accompanying drawings, not necessarily drawn to scale, in which the same reference numerals are used throughout for denoting corresponding elements.

DETAILED DESCRIPTION OF THE PREFERRED EMBODIMENTS

Figure 1:
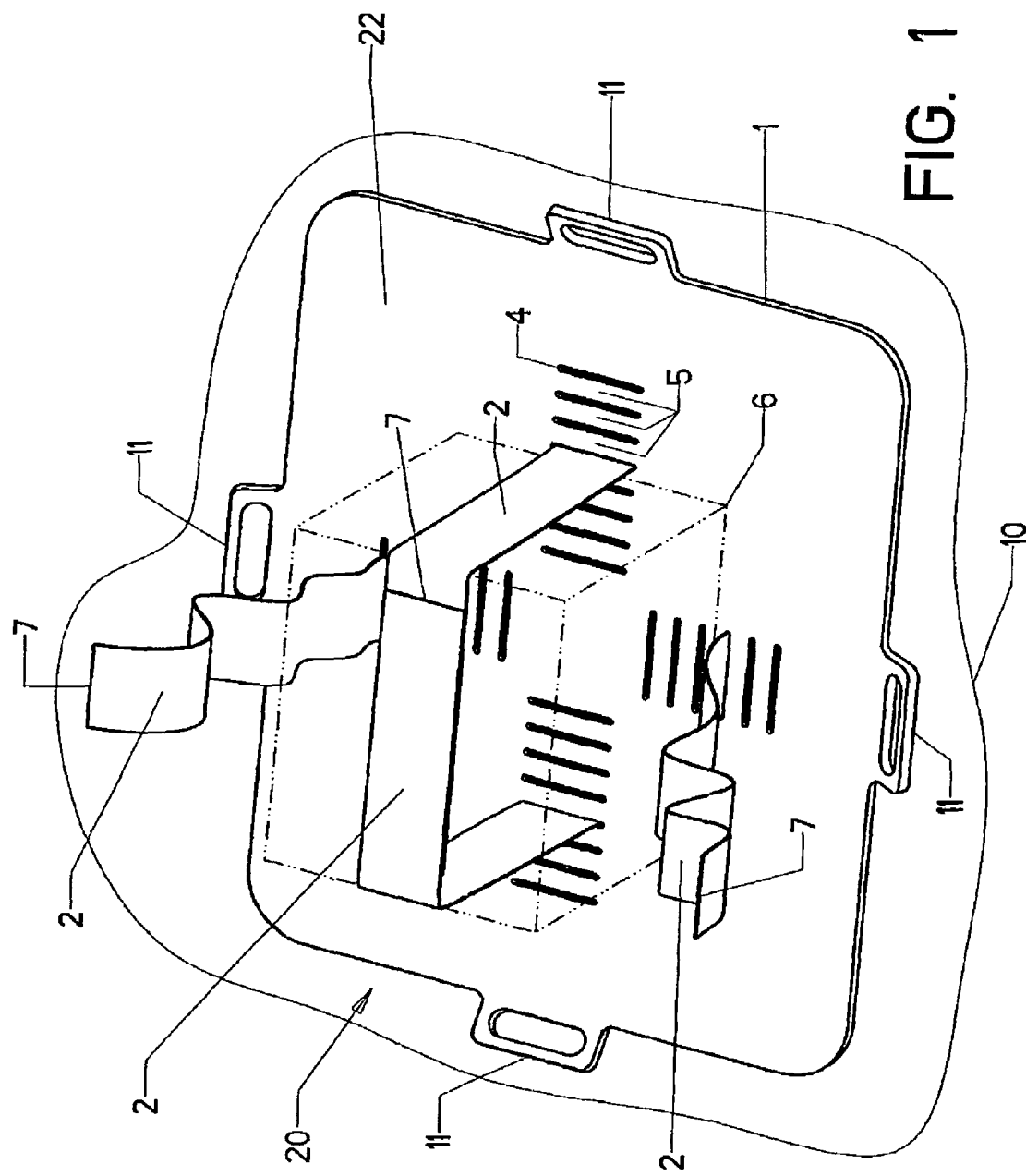
FIG. 1 is a perspective view of the carrier from the top, shown operatively supporting a representative article, and operatively supported by a surface of a vehicle.
Figure 2:
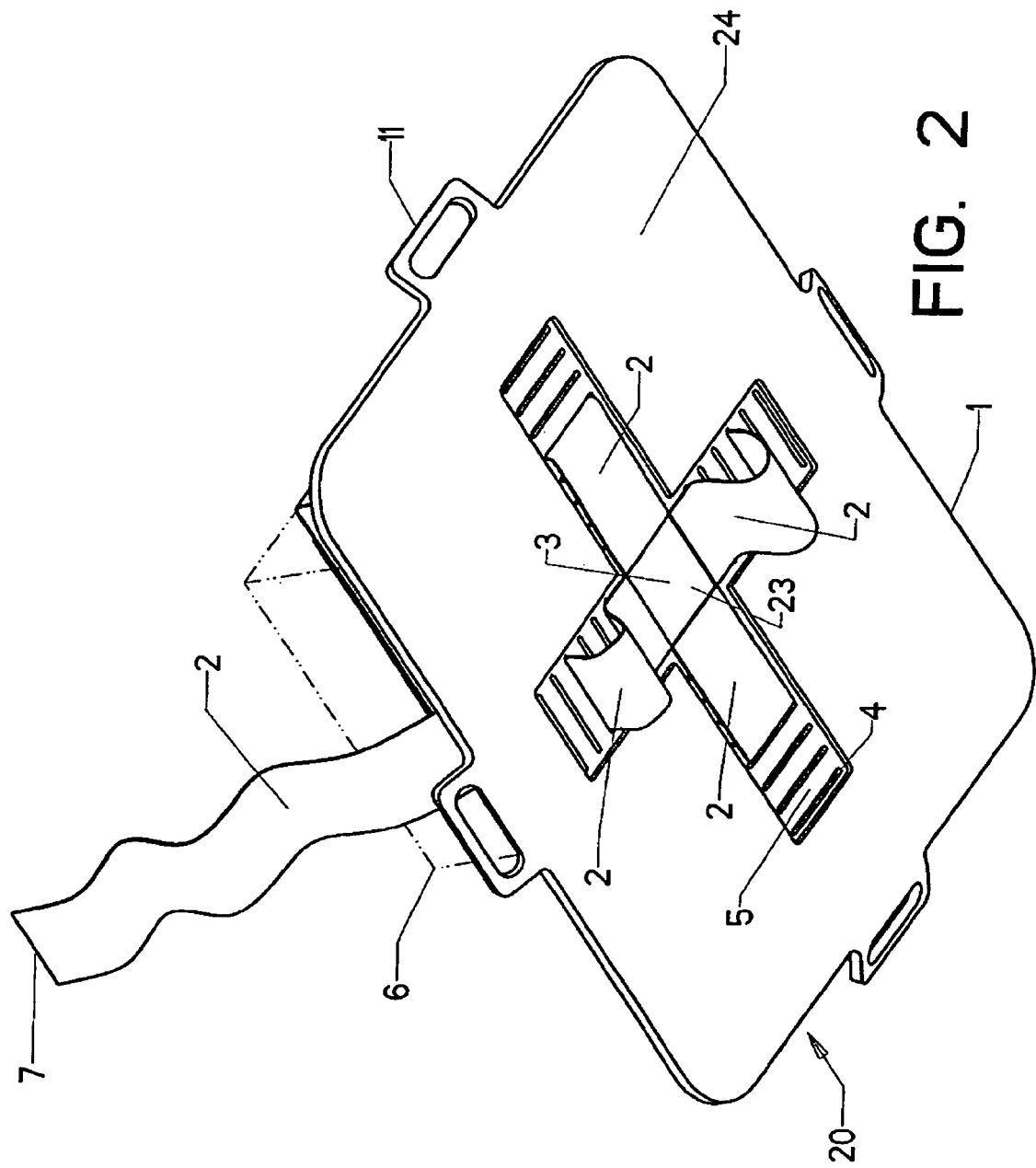
FIG. 2 is a perspective view of the carrier from the bottom, shown operatively supporting a representative article, with the vehicle surface not present.
Figure 3:
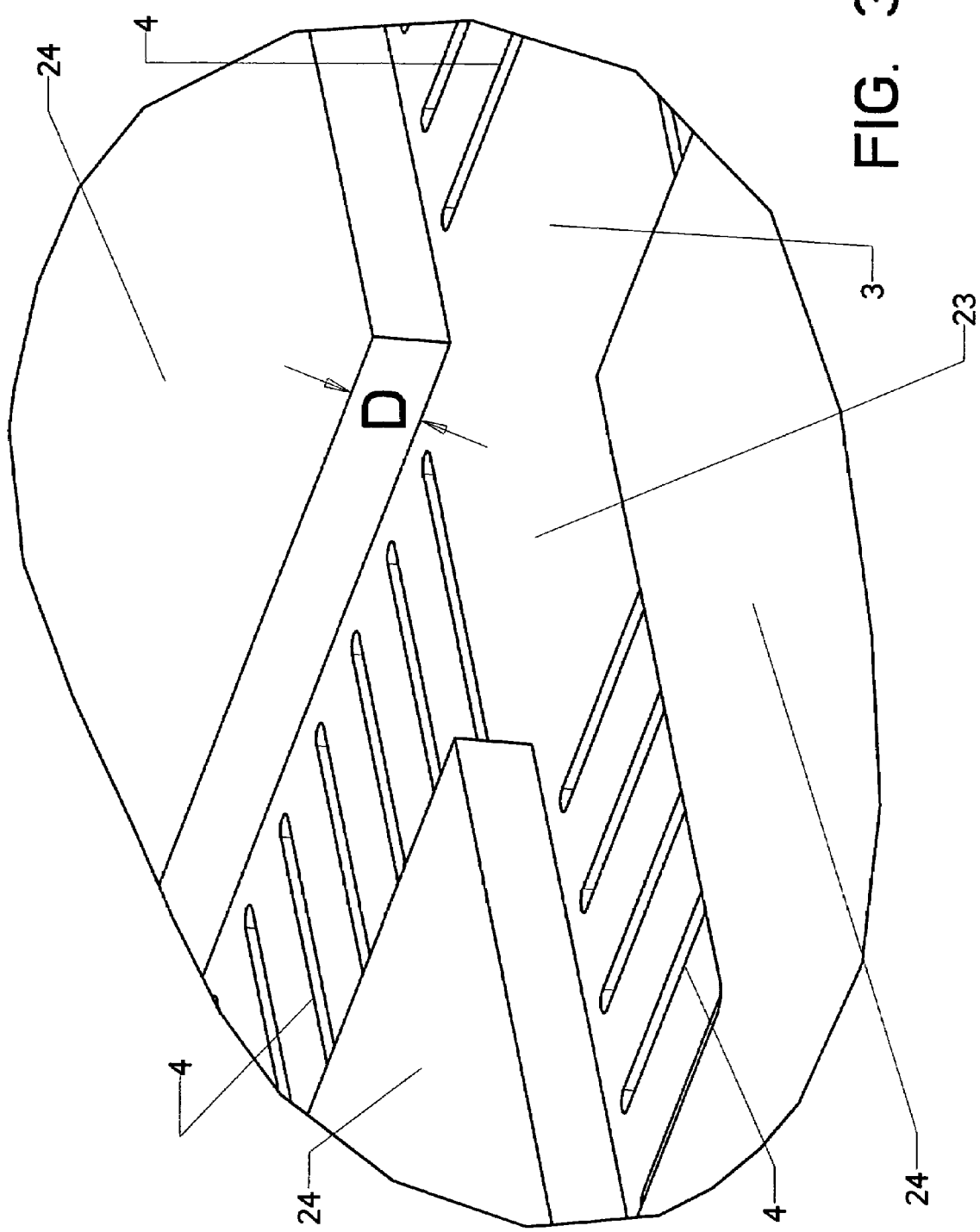
FIG. 3 is a partial perspective bottom view of the carrier, depicting the details of a recess area.
Figure 4:
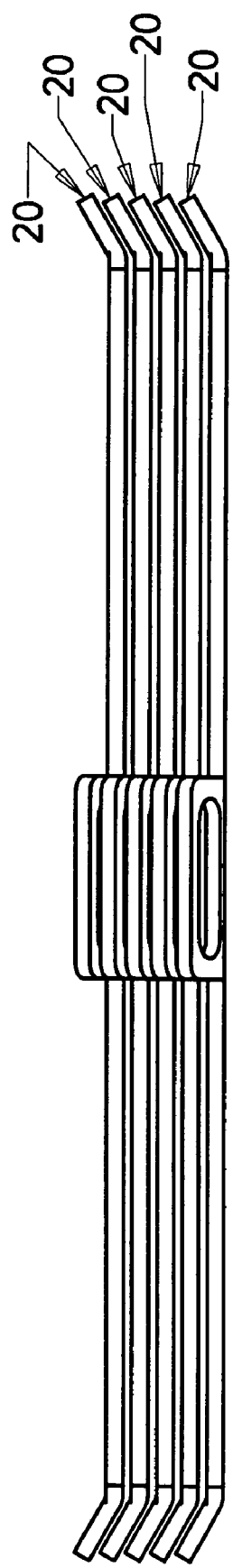
FIG. 4 is a side view of a stacked nesting of multiple carriers.

Referring to the drawings, the carrier 20 includes a base which is a substantially planar component or flat platform 1, a plurality of mating holding straps 2, a recess area 3 located on the bottom side of the platform 1, slots 4, members 5 which separate the slots 4, and handles 11 located along the periphery of the platform 1.

The platform 1 is preferably constructed from a sheet of rigid plastic, wood, metal, hard rubber, etc., as example, to describe the simplicity of the structure. The platform 1 shown in the figures is rectangular in shape, but the platform 1 may take any shape desired, such as but not limited to, polygon, circle, ellipse, or having a curvilinear perimeter. It will be understood that this structure can also be fabricated as: injection-molded plastic, thermoformed plastic, welded wireform, sheet metal, etc., as examples of more complex structural geometry that may afford a lower cost, stronger or more rigid structure, more efficient manufacturability, etc. It will be clear that, with any geometry, the platform 1 will always provide a top substantially planar surface 22 for supporting one or more articles 6 and a bottom substantially planar surface 24 for cooperation with a surface 10 of the vehicle (not shown). Examples of the surface 10 include any vehicle surface, such as but not limited to, an automobile trunk, floor, seat, a truck bed, a boat deck, seat or galley, an aircraft seat or floor, etc. Both surfaces 22 and 24 of the platform 1 are made of, or coated with, a slip-resistant material, such as but not limited to, rubber, elastomeric material, hard foam, soft plastic or the like. The purpose of the slip-resistant surfaces 22 and 24 is to prevent slipping, sliding, shifting or movement of the articles being supported and carried by the carrier 20, and to prevent slipping, sliding, shifting or movement of the carrier 20 on the surface 10 of the vehicle. The platform 1 itself may be composed of such a slip-resistant material. In the case of a more complex structural geometry for the platform 1, such as wireform, the portions of the platform 1 that engage the surface 10 of the vehicle and the articles 6, shall be coated with a slip-resistant surface.

One or more handles 11 are formed at an obtuse angle to the plane of the platform 1 to allow access for fingers to grasp the handle 11 when the platform 1 is operatively supported by the surface 10 of the vehicle, and to also allow multiple carriers to be stacked nested for storage space efficiency when the carrier is not operatively supporting the article 6.

In one embodiment, the one or more straps 2 are connected to the platform 1 at the bottom recess area 3 by rivets, staples, adhesive bond, snaps, clips, buckles or other permanent or temporary attachment devices. In another embodiment, the one or more straps 2 are removable from the carrier and not attached to the bottom recess area 3 of the platform 1. The one or more straps 2 can be made of any materials sufficiently strong to secure the articles onto the carrier 20. Moreover, in another embodiment the straps 2 could be replaced by ropes, strings, or other fastening devices.

The straps 2 shown in the figures mate with each other by hook-and-loop fastening 7, also known as Velcro®, where one of the straps 2 is determined as male and the other female, for the purposes of the mating. This male/female arrangement can also employ other buckle or fastening types or any other known manner or device for connecting straps together. The width and thickness of straps 2 can vary in dimension, and the straps 2 themselves can be elastic or stiff in regards to strength. In those cases where a small article 6 is carried, the excess strap 2 material normally available for larger articles 6 may be folded, rolled, and/or tucked aside as required or desired by the user.

One or more straps 2 load the holding force against the given member 5, so a given slot 4, in the case of complex structural geometry such as wireform, merely provides an opening for the strap 2 to pass through. The slots 4 may be of different lengths and widths. The platform 1 includes a plurality of slots 4 which preferably will be parallel to each other in rows as shown, to allow selection based on article 6 size. There may be multiple rows of slots corresponding to multiple straps, and these rows and straps may be at various angles to each other. The rows in the figures are shown exemplary to be perpendicular to each other. It will be understood that slot 4 size and spacing will affect the strength of the corresponding member 5.

The straps 2 are afforded clearance D which is a depth of the bottom recess area 3, between recess surface 23 where mounted and the bottom surface 24 of the platform 1, until passing through slots 4, so that straps 2 do not intentionally contact the surface 10 of the vehicle. This clearance D is provided so that the straps 2 do not cause the slip-resistant bottom surface 24 of the platform 1 to separate from the vehicle surface 10. It will be clear that the spacing or clearance D exists between the recess surface 23 and bottom surface 24 of the platform 1. In one embodiment, the surface 10 of the vehicle is substantially horizontal, although the surface 10 can also be angled, for instance, on the floor or hull of a vehicle such as a boat.

It will also be clear that, when the carrier 20 is not operatively supporting the article 6, and the carrier 20 is to be stored, the strap 2 will either be removable, or will collapse against and/or be wrapped around the platform 1, requiring a small volume of storage space.

It will be understood that, because the top of the article being carried is held only by the straps 2, open space between the straps 2 will provide access to contents of the one or more articles 6, for instance, when the top of the article 6 is open and the contents can be accessed.

The above described embodiments are merely illustrative of the present invention and represent a limited number of the possible specific embodiments that can provide applications of the principles of the invention. Numerous and varied other arrangements may be readily devised in accordance with these principles by those skilled in the art in keeping with the invention as claimed.

The invention claimed is:

1. An apparatus for supporting one or more articles of various sizes and shapes on a vehicle surface during transport with a mechanized vehicle, the apparatus comprising:
   one or more straps;
   a planar platform having a body and periphery and cooperating with said one or more straps for holding the one or more articles against the platform, the platform further comprising:
      a planar top surface for engaging the one or more articles being held by the one or more straps;
      a planar bottom surface parallel to the top surface for engaging the vehicle surface;
      one or more separately-appendant handles, protruding from and in substantially close proximity to said periphery, for grasping the platform;
      a plurality of bearing members arranged in succession to enable adjustment of the one or more straps;
      a plurality of slots separating said bearing members; and
   at least one recess, aligned with said plurality of slots and said bearing members, recessing from the bottom surface into the body of the platform, for accepting said one or more straps through at least two of said slots for engaging the straps against the bearing members and for preventing the straps from engaging the vehicle surface.

2. The apparatus of claim 1 wherein the platform top surface is further comprised of a slip resistant material.

3. The apparatus of claim 1 wherein the platform bottom surface is further comprised of a slip resistant material.

* * * * *